United States Patent

[11] 3,555,301

[72] Inventor James P. Hansen
Oxon Hill, Md.
[21] Appl. No. 681,678
[22] Filed Nov. 9, 1967
[45] Patented Jan. 12, 1971
[73] Assignee The United States of America as represented by the Secretary of the Navy

[54] APPARATUS AND TECHNIQUES FOR GENERATING VARIABLE DELAY PULSES FROM PARALLELED AVALANCHE TRANSISTORS
6 Claims, 9 Drawing Figs.

[52] U.S. Cl. .......... 307/246, 307/302, 328/67, 329/107, 307/248
[51] Int. Cl. .......... H03k 17/00
[50] Field of Search .......... 307/246, 302; 328/67; 329/107

[56] References Cited
UNITED STATES PATENTS

| | | | |
|---|---|---|---|
| 3,168,701 | 2/1965 | Foitzik et al. | 328/67 |
| 3,260,965 | 7/1966 | Schmal | 307/302X |
| 3,263,098 | 7/1966 | Marks et al. | 307/302X |
| 3,308,308 | 3/1967 | Bray | 307/302X |

OTHER REFERENCES

Manders, " Millimicrosecond Pulse Generator Using Avalanche Operation" , Fairchild Scan Conductor Application Data, App-35. Reprinted from the July-August 1960 edition of Military Systems Design.

*Primary Examiner*—Donald D. Forrer
*Assistant Examiner*—R. C. Woodbridge
*Attorneys*—R. S. Sciascia and A. L. Branning

ABSTRACT: Apparatus for generating variable delay pulses from paralleled avalanche transistors wherein the individual transistor collector bias voltages can be adjusted so as to control the time at which each of the transistors avalanche when a triggering signal is applied to each of the transistors.

INVENTOR
JAMES P. HANSEN

BY D. A. Kettlestrings AGENT
R. S. Sciascia ATTORNEY

INVENTOR
JAMES P. HANSEN

BY D.A. Kettlestrings AGENT
[signature] ATTORNEY

INVENTOR
JAMES P. HANSEN

BY D. A. Kettlestrings AGENT
R. S. Sciascia ATTORNEY

APPARATUS AND TECHNIQUES FOR GENERATING VARIABLE DELAY PULSES FROM PARALLELED AVALANCHE TRANSISTORS

BACKGROUND OF THE INVENTION

The present invention relates generally to improvements in pulse generators and the like and more particularly to new and improved apparatus for generating variable delay pulses from paralleled avalanche transistors wherein the individual transistor collector bias voltages are adjustable so that each transistor can be biased to avalanche at a predetermined voltage level on the leading edge of a trigger pulse which may be introduced to the base or collector of each of the transistors.

Many pulse generators have been developed in which the outputs of simple avalanche transistor pulse generating circuits are paralleled across a common load in order to produce fast rise-time, high current pulses or multiple pulse groups. The success of these generators relies on the ability of the circuit to control the triggered avalanche switching times of the transistors. Three basic techniques have been generally used to control the time delay between the incidence of a trigger pulse and the production of a current pulse through the load. Delay lines have been inserted between the trigger input and the individual transistors in order to delay the incidence of the trigger pulse by a predetermined amount to each of the transistors. In a second technique, delay lines have been inserted between the transistor outputs and the load in order to delay the incidence of the output pulses from the individual transistors with the load. Still another technique has been the use of shaping circuitry which must be inserted between the trigger input and the individual transistors in order to effectively delay the trigger pulse by a predetermined amount for each individual transistor by changing the amplitude and rise time of the trigger pulse.

Although these devices and techniques have served the purpose, they have not proved entirely satisfactory under all conditions of service for the reasons that fixed delay lines do not permit a continuous variation of the pulse delays, and if delay lines or pulse shaping circuitry is added to the pulse generator circuitry, impedance matching is usually required to prevent ringing and reflections. In addition, impedance matching is especially difficult to achieve in a low impedance output circuit. Still further difficulty has been encountered in utilizing these techniques because, generally, the transistors must be selected for matched avalanche characteristics, and this requirement restricts the ease of replacement of the transistors units.

SUMMARY OF THE INVENTION

The general purpose of this invention is to provide a pulse generator which embraces all of the advantages of similarly employed pulse generators and possesses none of the aforedescribed disadvantages. To obtain this, the present invention contemplates a unique, adjustable, collector-biased arrangement for a plurality of avalanche transistors paralleled across a common load in order to produce fast rise-time, high current pulses or multiple pulse groups wherein the delay of the pulses or pulse groups is adjustable.

An object of the present invention is the provision of a compact generator of high current pulse or pulse groups for pulse modulating low impedance devices such as GaAs injection laser diodes.

Another object is to provide a pulse generator adapted to be used in a pulse code modulated or a pulse position modulated communication system.

A further object of the invention is the provision of a fast rise-time avalanche transistor pulse generator which utilizes a minimum number of circuit components to control pulse delays and wherein no additional impedance matching is required.

Still another object is to provide a technique for generating variable delay pulses from paralleled avalanche transistors wherein the technique relies on the adjustment of the transistor collector voltages rather than on the shaping or delaying of the trigger pulses.

Yet another object of the present invention is the provision of an avalanche transistor pulse generator wherein pulse delays can be continuously varied within the interval of the trigger pulse rise-time.

Still a further object is to provide a simple paralleled transistor pulse generator capable of providing a variety of output pulse waveforms ranging from a single pulse to a multipulse group with variable pulse-to-pulse delays.

Yet another object is to provide a paralleled transistor pulse generator wherein the paralleled transistors need not have closely matching avalanche characteristics and where different types of transistors may be used in the same circuit.

Other objects and features of the invention will become apparent to those skilled in the art as the disclosure is made in the following description of preferred embodiments of the invention as illustrated in the accompanying drawings.

DESCRIPTION OF THE PREFERRED EMBODIMENTS

Figure 1:
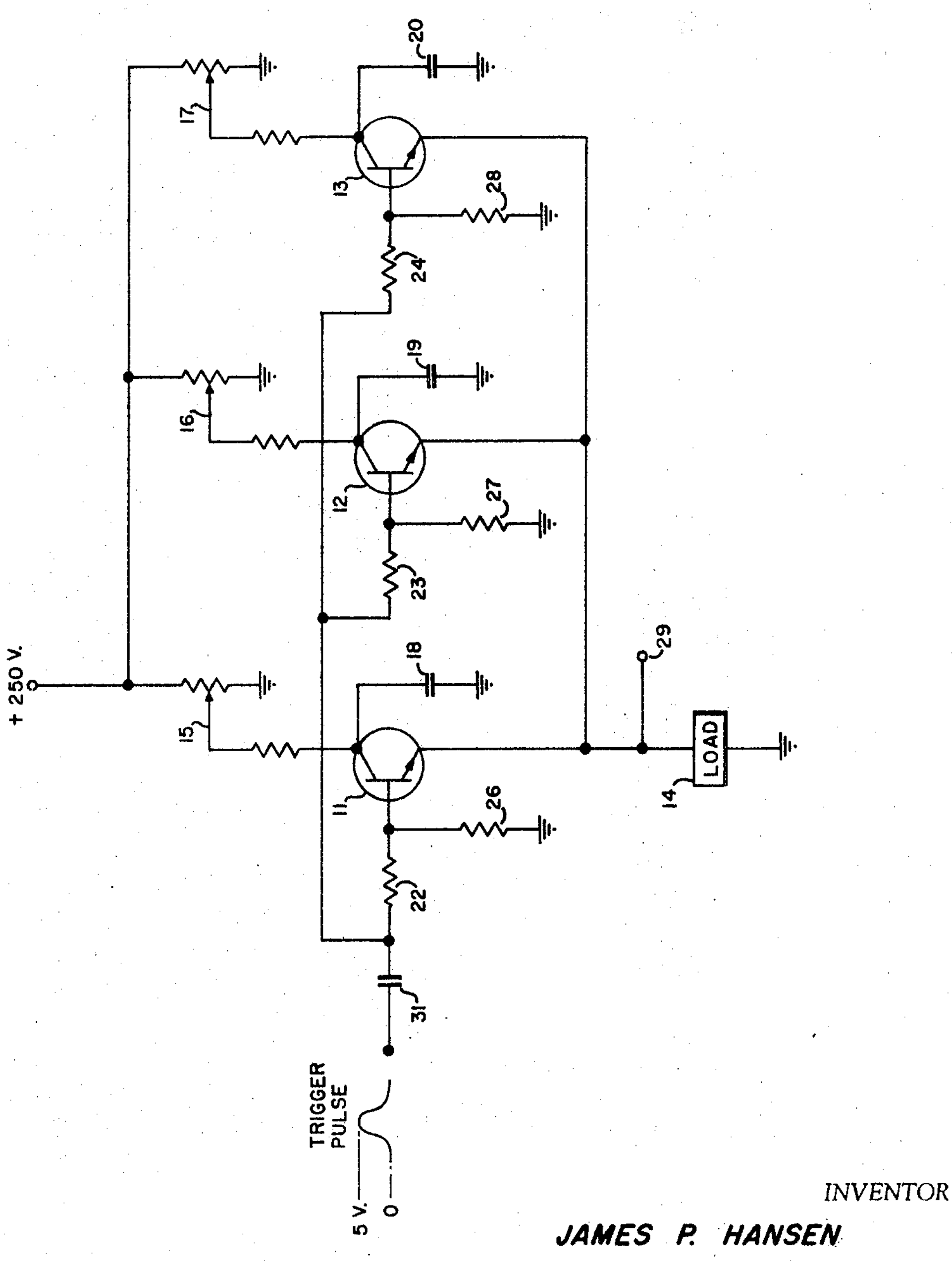
FIG. 1 shows, in schematic form, one embodiment of the invention.

Referring now to the drawings there is shown in FIG. 1, which illustrates a basic embodiment of the invention, three paralleled avalanche transistors 11—13 wherein the emitters are coupled to a load 14 and to an output terminal 29 and wherein each of the collectors is coupled to a respective voltage divider 15—17. In addition, each of the transistors 11—13 is coupled to a respective charging capacitor 18—20 at its collector; and the base of each of the transistors 11—13 is coupled to an impedance matching and biasing resistor 22—24, respectively, and to a second biasing resistor 26—28, respectively.

By utilizing the circuit of FIG. 1 with a relatively high positive DC voltage applied to the voltage dividers 15—17 and to the collectors of avalanche transistors 11—13, the transistors can be made to avalanche at separated predetermined times or simultaneously when a positive trigger pulse is applied to the bases of the transistors, depending upon the bias applied to the collectors of each transistor, and the amount of bias applied is controlled by the adjustment of each respective voltage divider 15—17. Prior to the initiation of the trigger pulse, each of the charging capacitors 18—20 receives and stores a charge from the collector bias so that when the trigger pulse is incident to each of the bases of transistors 11—13, these transistors avalanche to produce fast rise-time, high current pulses which appear across load 14, at terminal 29, and because this circuit is particularly adapted for evaluating laser diodes, the load 14 may be such a diode.

Figure 2A:
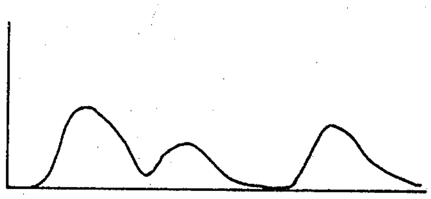
FIG. 2*a* and FIG. 2*b* illustrates two types of waveforms which can be generated at the output of the circuit of FIG. 1.
Figure 2B:
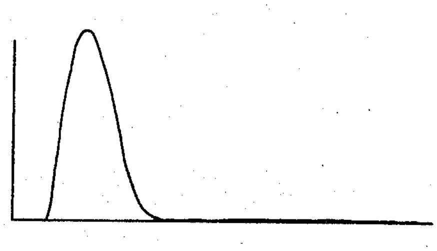

The advantages of this invention become readily apparent by reference to FIGS. 2A and 2B wherein FIG. 2A represents the output waveform produced when three unmatched transistors are biased at the same collector voltage and wherein FIG. 2B represents the output waveform produced when three unmatched transistors are biased by means of this invention for synchronous avalanche.

Figure 3A:
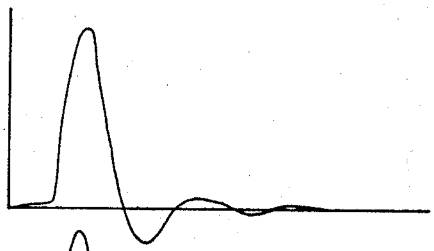
FIG. 3*a* and FIG. 3*b* shows additional waveforms which can be generated at the output of the circuit in FIG. 1.
Figure 3B:
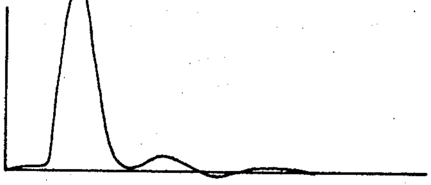

FIG. 3 illustrates the results of using a novel technique in conjunction with this invention for protecting the load 14, which may be an injection laser, from a negative transient. FIG. 3A illustrates a characteristic output signal which may occur across the load 14 while FIG. 3B shows the negative transient is canceled out by means of an avalanche transistor within the circuit, the positive output pulse of which is delayed so as to coincide with the negative transient. This delay is inserted merely by biasing the canceling transistor to switch at a higher trigger level than that required by the transistors producing the main output pulse.

Although a 250 volt bias voltage and a 5 volt trigger pulse are illustrated in FIG. 1, it should be understood that these values are merely representative of many combinations of values which may be utilized for the operation of this circuit. In addition, for a further discussion of the operation and characteristics of avalanche transistors the article by S. P. Miller and J. J. Ebers in Volume 34 of the Bell System Technical Journal at pages 883-902 should be referred to. It also should be understood that although the trigger pulse has been shown to be introduced at the bases of the transistors, the trigger voltage may also be introduced at the collectors of each of the transistors.

Thus, it can be seen that the pulse delays of a paralleled avalanche transistor pulse generator can be controlled by adjusting the individual transistor collector bias voltages. The static bias point of each transistor determines the amount of trigger voltage necessary to initiate avalanche in that transistor, and each of the transistors in the circuit can be biased to avalanche at a different voltage level on the leading edge of the trigger pulse, which is normally applied to the bases of the transistors. Additionally, the paralleled transistors can act as level detectors with the delays between avalanche pulses corresponding to the time intervals between selected voltage levels of the rising slope of the trigger pulse, and the rise time and repetition rate of the trigger voltage determines the range of pulse delays which may be selected so that the maximum delay between any two pulses of an output pulse group is limited to the rise-time of the trigger pulse which initiated that pulse group.

Figure 4:
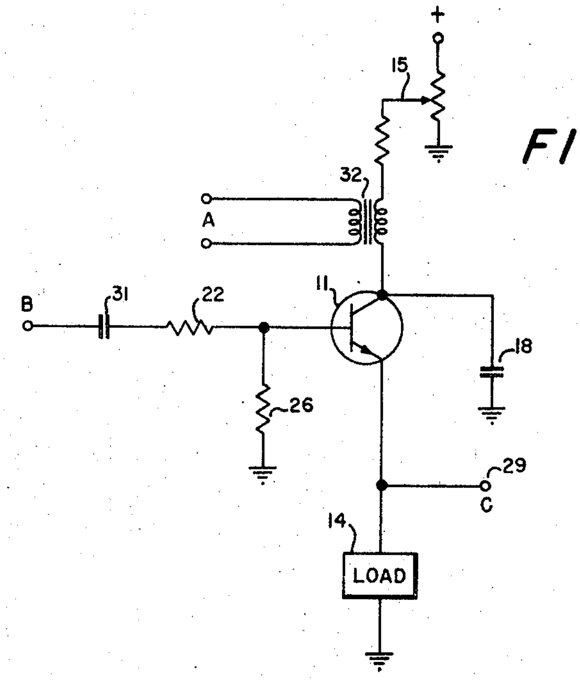
FIG. 4 illustrates a second embodiment of the invention.
Figures 5A, 5B, 5C:
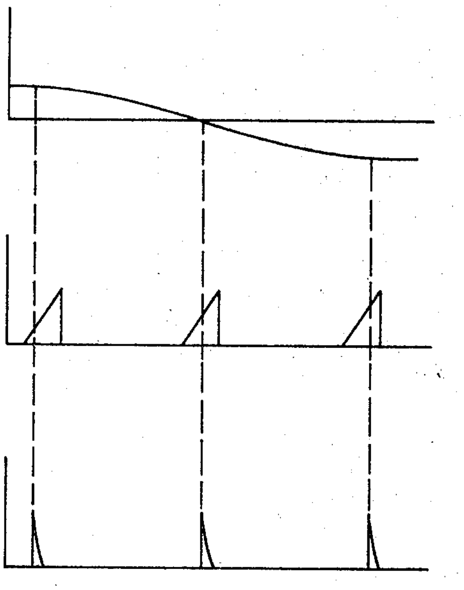
FIG. 5*a* and FIG. 5*b* shows the various waveforms associated with the embodiment of FIG. 4.

Referring now to FIG. 4 there is shown an avalanche transistor pulse generating circuit in which an amplitude modulated signal at the collector produces a pulse-position modulated avalanche pulse at the output. Although only one transistor and associated elements are shown, several of these circuits could be paralleled to produce a simple multiple PPM (Pulse-position modulated) system. FIG. 4 illustrates a one transistor circuit corresponding to a similar portion of the circuit in FIG. 1, but with the addition of transformer 32. Here, as in the circuit of FIG. 1, a relatively high positive DC voltage is applied to the collector of transistor 11 through the voltage divider 15. In addition, control of the collector voltage is achieved by applying a slowly varying voltage, represented by FIG. 5A, to the primary winding of transformer 32. Thus when a positive trigger pulse, represented by FIG. 5B, is applied to the base of transistor 11, the point at which an output pulse, represented by FIG. 5C, will be generated across the load 14 will be determined within the rise-time of the trigger pulse by the amplitude of the slowly varying voltage which is applied to the primary of transformer 32. Thus, the amplitude modulated signal, as shown in FIG. 5A, that is applied to the primary of transformer 32 will produce a pulse-position modulated avalanche pulse across the load 14 at the output terminal 29 of the circuit.

It can be seen that this invention provides for a simple, inexpensive circuit capable of generating fast rise-time, high current pulses with variable pulse-to-pulse spacings and wherein a variety of output pulse waveforms can be generated which range from a single pulse to a multipulse group with variable delays between the pulses. This is accomplished with a minimum number of circuit components and without the additional requirement of impedance matching.

It should be understood, of course, that the foregoing disclosure relates to only preferred embodiments of the invention and that numerous modifications or alterations may be made therein without departing from the spirit and the scope of the invention as set forth in the appended claims. For example, although NPN avalanche transistors are preferred, PNP avalanche transistors could be utilized with the appropriate changes in bias and trigger pulse polarities.

I claim:

1. A pulse generator, comprising:
means for storing an electrical charge;
means coupled to said charge storing means for selectively varying the charge thereon, wherein said charge varying means includes a DC voltage source, an adjustable voltage divider coupled between said voltage source and said charge storing means, and a transformer having a secondary winding coupled to said transistor and to said voltage divider and having a primary winding in operative relationship with said secondary winding;
a plurality of avalanche transistors, said transistors having their emitters in common and driving a common load, said transistors coupled to said charge storing means, said transistors being biased by said storing means such that they do not trigger for a predetermined period of time; and
input means coupled to said transistor for enabling the transmission of a trigger signal to said transistors; said transformer modulating said transistors output signal.

2. A variable delay pulse generator, comprising:
a plurality of avalanche transistors having the emitters thereof in electrical common and driving a common load;
means coupled to each of said transistors for storing an electrical charge;
means coupled to each of said storing means for selectively varying the charges therein; and
input means electrically coupled together and coupled to each of said transistors for enabling the transmission of a trigger signal to each of said transistors.

3. A variable delay pulse generator, comprising:
a plurality of avalanche transistors having the emitter thereof in electrical common;
means coupled to each of said transistors for storing an electrical charge;
means coupled to each of said storing means for selectively varying the charges therein, wherein each of said charge varying means includes, a DC voltage source, an adjustable voltage divider coupled between said voltage source and a respective one of said charge storing means whereby each of said transistors may trigger at different input voltages, and a laser diode coupled to the emitters of said transistors; and
input means electrically coupled together and coupled to each of said transistors for enabling the transmission of a trigger signal to each of said transistors.

4. The pulse generator of claim 3 wherein each of said charge-storing means includes a capacitor coupled to the collector of each of said avalanche transistors.

5. The pulse generator of claim 3 wherein each of said input means includes:
biasing and impedance matching resistors coupled to the base of each of said transistors.

6. The pulse generator of claim 3 wherein each of said charge-varying means includes:
a DC voltage source;
an adjustable voltage divider coupled between said voltage source and a respective one of said charge-storing means; and
a transformer having a secondary winding coupled to a respective transistor and to said voltage divider and having a primary winding in operative relationship with said secondary winding.
a transformer having a secondary winding coupled to a respective transistor and to said voltage divider and having a primary winding in operative relationship with said secondary winding.